United States Patent
Shaffer et al.

(10) Patent No.: US 6,724,862 B1
(45) Date of Patent: Apr. 20, 2004

(54) METHOD AND APPARATUS FOR CUSTOMIZING A DEVICE BASED ON A FREQUENCY RESPONSE FOR A HEARING-IMPAIRED USER

(75) Inventors: Shmuel Shaffer, Palo Alto, CA (US); Robert T. Bell, Bountiful, UT (US)

(73) Assignee: Cisco Technology, Inc., San Jose, CA (US)

( * ) Notice: Subject to any disclaimer, the term of this patent is extended or adjusted under 35 U.S.C. 154(b) by 25 days.

(21) Appl. No.: 10/047,389

(22) Filed: Jan. 15, 2002

(51) Int. Cl.[7] .............................................. H04M 11/00
(52) U.S. Cl. ...................... 379/52; 379/347; 381/314
(58) Field of Search .................. 379/52, 93.25, 379/93.14, 347; 381/312, 314, 315; 704/221, 222

(56) References Cited

U.S. PATENT DOCUMENTS 6,061,431 A     5/2000  Knappe et al. ............... 379/52
6,212,496 B1    4/2001  Campbell et al. ........... 704/221
6,360,252 B1 *  3/2002  Rudy et al. .................. 709/206

FOREIGN PATENT DOCUMENTS

| JP | 408191340 A  | * | 7/1996  | ............ H04M/1/00 |
| JP | 02001285409 A | * | 10/2001 | ............ H04M/1/00 |
| KR | 2001035908 A | * | 5/2001  | ............ H04N/7/18 |

\* cited by examiner

*Primary Examiner*—Melur Ramakrishnaiah
(74) *Attorney, Agent, or Firm*—Baker Botts L.L.P.

(57) ABSTRACT

A method and apparatus for customizing a device based on a frequency response for a hearing-impaired user are disclosed. The device receives an identifier associated with a hearing-impaired user and retrieves a frequency filter associated with the hearing-impaired user from a database by providing the identifier. The device applies the frequency filter to audio signals in a call session conducted over a network for presentation to the hearing-impaired user at the device.

37 Claims, 3 Drawing Sheets

| USER ID | PASSWORD | FREQUENCY FILTER | VOLUME |
|---|---|---|---|
| JANE DOE | APPLE | 76a | 7 |
| 126.10.201.3 | ORANGE | 76b | 5 |
| jane@cisco.com | GREEN | | 3 |
| 512-555-1234 | 4567 | 76c | 6 |
| ○○○ | ○○○ | ○○○ | ○○○ |

FIG. 6

METHOD AND APPARATUS FOR CUSTOMIZING A DEVICE BASED ON A FREQUENCY RESPONSE FOR A HEARING-IMPAIRED USER

TECHNICAL FIELD OF THE INVENTION

This invention relates in general to communications, and more particularly to a method and apparatus for customizing a device based on a frequency response for a hearing-impaired user.

BACKGROUND OF THE INVENTION

People with hearing impairments generally have trouble understanding conversations conducted over a telephone. Many telephones have volume controls that can compensate for a mild hearing loss by allowing a user to increase the volume of audio signals being broadcast to the user from the speaker in the handset. The volume controls, however, amplify the entire audio signal and do not compensate for particular frequencies that are located outside of the particular user's hearing range. The volume controls must also be manually adjusted every time a person with a hearing impairment uses the telephone. When a person with normal hearing wishes to use the same telephone, the volume levels must be adjusted back to a normal level. Furthermore, increasing the local gain in the telephone handset may decrease the hearing-impaired user's ability to distinguish speech from the amplified background noise.

SUMMARY OF THE INVENTION

In accordance with the present invention, the disadvantages and problems associated with customizing a device based on a frequency response for a hearing-impaired user have been substantially reduced or eliminated. In a particular embodiment, a method for customizing a device based on a frequency response for a hearing-impaired user is disclosed that retrieves a frequency filter associated with a hearing-impaired user from a database and applies the frequency filter to audio signals in a call session conducted at a device.

In accordance with one embodiment of the present invention, a method for customizing a device based on a frequency response for a hearing-impaired user includes receiving an identifier associated with a hearing-impaired user at a device coupled to a network. A frequency filter associated with the hearing-impaired user is retrieved from a database by providing the identifier and applied to audio signals in a call session conducted over the network for presentation to the hearing-impaired user at the device.

In accordance with another embodiment of the present invention, a method for customizing a telephone based on a frequency filter associated with a hearing-impaired user includes receiving an identifier associated with a hearing-impaired user at a telephone coupled to a network. A frequency filter associated with the hearing-impaired user is retrieved from a database by providing the identifier and applied to audio signals received by the hearing-impaired user in a telephone call conducted over the network.

In accordance with a further embodiment of the present invention, a communication apparatus includes an interface that couples to a network, a control unit coupled to the interface, and a processing resource and a speaker coupled to the control unit. The control unit receives an identifier associated with a hearing-impaired user and retrieves a frequency filter associated with the hearing-impaired user from a database by providing the identifier. The processing resource applies the frequency filter to audio signals received at the interface and the speaker presents filtered audio signals generated by the processing resource to the hearing-impaired user.

Important technical advantages of certain embodiments of the present invention includes the ability to access a frequency filter associated with a frequency response for a hearing-impaired user from any device coupled to a network. When the hearing-impaired user establishes a call session at a device coupled to the network, the user logs into the device by providing a unique identifier. The device uses the identifier to retrieve the frequency filter associated with the hearing-impaired user from a database coupled to the network. The device then applies the frequency filter to audio signals in any calls received or placed by the user at the device.

Another important technical advantage of certain embodiments of the present invention includes the ability to apply a frequency filter to telephone calls conducted by a plain old telephone system (POTS) telephone. To operate the POTS telephone, the hearing-impaired user inputs an identifier. A call manager communicating with the POTS telephone receives the identifier and uses the identifier to retrieve a frequency filter associated with the hearing-impaired user from a central database. The call manager further instructs a call resource to apply the frequency filter to audio signals being sent to the POTS telephone and communicates the filtered audio signals to the hearing-impaired user at the POTS telephone.

All, some, or none of these technical advantages may be present in various embodiments of the present invention. Other technical advantages will be readily apparent to one skilled in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
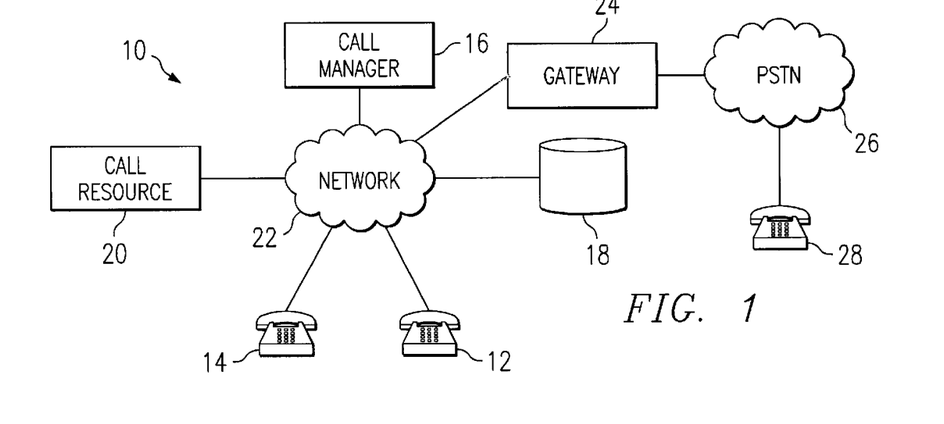
FIG. 1 illustrates a block diagram of a communications network including a plurality of devices that may be customized based on a frequency response for a hearing-impaired user in accordance with the teachings of the present invention.

FIG. 1 illustrates a block diagram of a communication system, indicated generally at 10, for customizing a device based on a frequency response for a hearing-impaired user. In the illustrated embodiment, system 10 includes devices 12 and 14 (generally referred to as devices 12), call manger 16, database 18 and call resource 20 coupled to network 22. In one embodiment, devices 12 are customized based on a frequency response for a hearing-impaired user by retrieving a frequency filter associated with the hearing-impaired user from database 18 and applying the frequency filter to a call session conducted by devices 12. The ability to access database 18 and retrieve the frequency filter allows the user to have an improved listening experience during the call sessions at any of devices 12 coupled to network 22.

Although a specific communication network is illustrated in FIG. 1, the term "network" should be interpreted as generically defining any network capable of transmitting telecommunication signals, data and/or messages. Network 22 represents any suitable collection and arrangement of communications equipment supporting the transport and delivery of packets, cells, or other portions of information (generally referred to as packets). For example, network 22 may be one or a collection of components associated with the public switched telephone network (PSTN), a local area network (LAN), a wide area network (WAN), a global computer network such as the Internet, or any other communications equipment suitable for providing wireless and/or wireline communications. In operation, network 22 routes various packets of information associated with communication sessions along different physical paths.

In a particular embodiment, network 22 may be an Internet Protocol (IP) network. However, network 22 may be any type of network that allows transmission of audio and video telecommunication signals, as well as traditional data communications. Therefore, although subsequent description will primarily focus on IP communications, it should be understood that other appropriate methods of transmitting media over a network, such as a Frame Relay, Asynchronous Transfer Mode (ATM), or other packet-based network, are also included within the scope of the present invention.

Network 22 may be coupled to other IP networks and may communicate media between devices 12, and other devices located on different, but interconnected, IP networks. Network 22 may also be coupled to non-IP communication networks through gateway 24. In the illustrated embodiment, network 22 couples to a public switched telephone network (PSTN) 26. In alternative embodiments, network 22 may couple to a private branch exchange (PBX), a wireless network or any other non-IP communication network. Gateway 24 may digitize a telephone or data signal communicated by device 28 from PSTN 26 if it is not already digitized, compress the digitized signal and route it to a destination over network 22 in packet form. Gateway 24 may also convert packets of data into telephone or data signals that may be transmitted across PSTN 26 to device 28. Gateway 24 may further perform functions similar to devices 12 and it is contemplated that later references to devices 12 may include gateway 24.

IP networks and other packet-based networks typically transmit media by placing the data in packets and sending each packet individually to the selected destination. Unlike a circuit-switched network, such as the PSTN, a dedicated circuit is not required for the duration of a call over network 22. Instead, devices 12 may send packets across network 22 as network 22 becomes available for transmission. This feature makes bandwidth available for additional communications when devices 12 are not communicating media.

The technology that allows voice media in particular to be transmitted over a packet-based network may be referred to as Voice over Packet (VoP). Devices 12 may have the capability to encapsulate a user's voice or other content into data packets so that the content may be transmitted over network 22. Devices 12 may, for example, include cordless or cellular telephones, personal digital assistants (PDAs), or other wireless devices. Also, devices 12 may include telephony software running on a computing device, traditional plain old telephone (POTS) devices, analog phones, digital phones, IP telephony devices, or other computing and/or communication devices that communicate media using analog and/or digital signals.

System 10 includes call manager 16 that manages the overall establishment of calls occurring over network 22. Call manager 16 is an application that controls call processing, routing, telephone features and options (such as call hold, call transfer, call waiting, and caller ID), device configuration, and other functions and parameters within network 22. Call manager 16 may control one or more of devices 12 coupled to network 22. Call manager 16 may also control devices located on other networks communicating with network 22. Call manager 16 may be implemented as hardware and/or software executing on one or more computers coupled to network 22. The call manager software or logic may be embodied in any type of medium including, but not limited to, hard drives, diskettes, CD-ROMs, DVD-ROMs, optical or magnetic media, field programmable arrays (FPGAs), embedded processors, or any other suitable media.

In one embodiment of system 10, signaling to and from devices 12 during a call session may be first passed through call manager 16. Signaling between devices 12 and call manager 16 may be performed using any appropriate standards-based or proprietary signaling method, including, but not limited to, a direct signaling model, such as H.323, session initiation protocol (SIP), media gateway control protocol (MGCP) or any other suitable technique. Call manager 16 may provide signaling for the call session and may instruct call resource 20 to apply a frequency filter to audio signals communicated to and/or from devices 12.

Call resource 20 couples to network 22 and may be separate from or a part of call manager 16, devices 12 and/or gateway 24. Call resource 20 includes multiple media processors that exchange and mix media streams associated with devices 12 participating in a call over network 22. Call resource 20 supports the G.711 codec standard, the G.723 codec standard, the G.729 codec standard or any other standard capable of encoding audio information. The media processors in call resource 20 operate with controllers, microprocessors, and/or digital signal processing (DSP) resources and perform encoding, transcoding, compressing, decompressing, decoding, mixing, and other signal processing functions to control a call session. Call resource 20 receives and directs the media streams to appropriate media processors, which encode, decode, and/or transcode the media streams into a proper format. The media processors also may receive a frequency filter associated with a hearing-impaired user from database 18 and apply the frequency filter to the audio signals in a call session placed or received by the hearing-impaired user.

Database 18 may be a relational, object-oriented, or other appropriate database that stores information associated with multiple users that have access to network 22. Furthermore, database 18 could be part of a specific system, such as, for example, a business, or, more powerfully, part of a general directory schema and accessed via an interface such as Lightweight Directory Access Protocol (LDAP). Although a database is described, the term "database" should be interpreted as generically defining any database or directory capable of storing information associated with the users registered to access network 22.

In one embodiment, device 12 may be configured as the primary extension on network 22 for a specific user, e.g., a hearing-impaired user. For example, device 12 may be configured to include user specific functions, such as speed dials programmed by the user, links to services available from network 22 that the user has permission to access, or any other suitable function that may be configured on device 12. The user places or receives a call and/or accesses any services available from network 22 by logging into device 12 with an identifier that is unique for the user. The identifier may include a user name, an address, a telephone number, a password and/or pin number, or any other suitable information that uniquely identifies the user on network 22. Call manager 16 uses the identifier to authenticate the hearing-impaired user's identity and access database 18 to determine what services may be configured on device 12. For example, database 18 may contain a list of users that have access to network 22 and a list of services available from network 22 that may be accessed by each user. Call manager 16 retrieves the services associated with the identifier and configures the services on device 12.

In one embodiment, the hearing-impaired user customizes device 12 based on the hearing-impaired user's frequency response, which may improve the user's listening experience during a call conducted over network 22. The user may generate a frequency filter to customize the device through an interactive session. For example, call manager 16 may determine that the user has access to a hearing test service based on the identifier provided by the user and may configure the hearing test as a service on device 12. The user selects the hearing test and is prompted to respond to various tones provided to the user through a speaker at device 12. The user responds to the various tones by pressing a button or by speaking into a microphone at device 12. Device 12 collects the user's responses to the various tones and generates the frequency filter based on the user's responses.

If device 12 does not receive a response from the user in a predetermined amount of time, device 12 determines that the user cannot hear the tone and records the tone in the frequency filter as an insensitive frequency. If the user responds within the allocated time period, device 12 records the tone in the frequency filter as a sensitive frequency. The process is repeated for a range of frequencies that may occur during normal conversation until device 12 has collected enough information from the user to generate the frequency filter. In an alternative embodiment, the frequency filter may be generated by the hearing-impaired user externally from device 12 and either directly loaded into device 12 and/or database 18 or loaded into device 12 and/or database 18 from another device coupled to network 22.

Once the hearing-impaired user has generated the frequency filter, call manager 16 or device 12 stores the filter in database 18 as a service that should be configured when the hearing-impaired user logs into any of devices 12 coupled to network 22. For example, the hearing-impaired user may log off of device 12 and log into device 14 by providing the identifier associated with the hearing-impaired user. Call manager 16 verifies the hearing-impaired user's identity based on the identifier and accesses database 18 to configure the services associated with the hearing-impaired user on device 14.

Device 14 may directly retrieve the frequency filter during the configuration process or device 14 may send a request to call manager 16 to retrieve the frequency filter from database 18 and deliver the frequency filter to device 14. The request may be sent through User Datagram Protocol (UDP) Transmission Control Protocol (TCP), Stream Control Transmission Protocol (SCTP) or any other suitable transport protocol. Device 14 or call manager 16 retrieves the frequency filter by locating database 18 on network 22, providing the identifier associated with the user at device 14 to database 18 and instructing database 18 to communicate the frequency filter associated with the identifier to device 14. Call manager 16 may also deliver the frequency filter to the remote device communicating with device 14 and instruct the remote device to apply the frequency filter to audio signals generated at the remote device before the signals are placed in packets and communicated to device 14 over network 22.

In one embodiment, device 14 may include processing resources that are used to apply the frequency filter to audio signals in a call session. In an alternative embodiment, device 14 may not include processing resources. In this example, call manager 16 retrieves the frequency filter associated with the hearing-impaired user from database 18 and communicates the frequency filter to call resource 20. During the call session, call manager 16 directs all media packets communicated to and from device 14 to call resource 20. Media processors in call resource 20 apply the frequency filter to the audio signals in the media packets sent by the remote device and received by device 14 to create a media stream containing filtered audio signals. The filtered audio signals are communicated by call manager 16 to device 14 and presented to the user through a speaker at device 14.

In a further embodiment, gateway 24 may include processing resources that can apply the frequency filter. For example, a user at device 28 may access network 22 by dialing a number that provides a communication link with gateway 24. Gateway 24 obtains a series of digits, either in analog or digital form, from device 28 through automatic number identification (ANI). The digits may represent the telephone number or IP address associated with device 28. Once gateway 24 identifies device 28, gateway 24 sends a request to call manager 16 to retrieve the frequency filter associated with the identified user at device 28 from database 18. Call manager 16 delivers the frequency filter to gateway 24 and gateway 24 applies the frequency filter to audio signals in a call session conducted by device 28.

Figure 2:
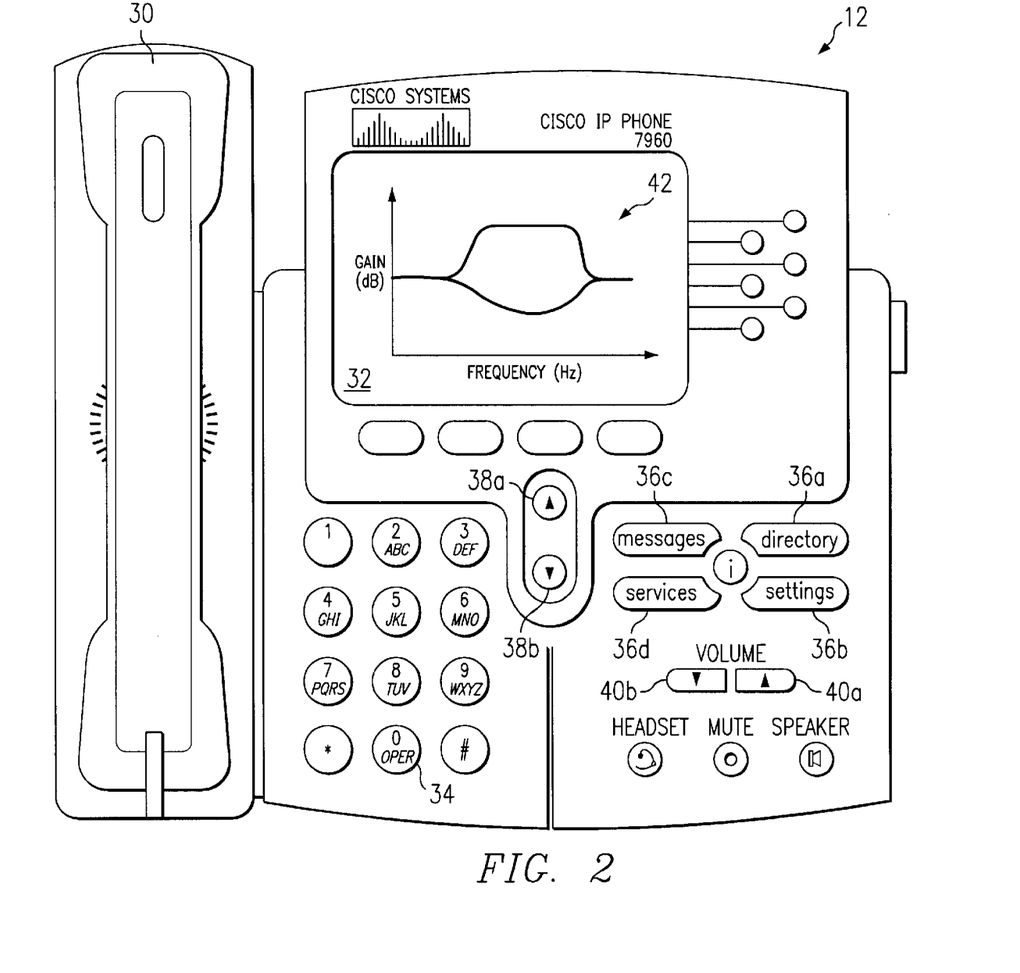
FIG. 2 illustrates a top view of a device that is customized based on the frequency response for the hearing-impaired user.

FIG. 2 illustrates a top view of devices 12 that are customized based on a frequency response for a hearing-impaired user. In the illustrated embodiment, device 12 include handset 30, display 32, keypad 34, function buttons 36a through 36d, selection buttons 38a and 38b, and volume buttons 40a and 40b. Device 12 may be a traditional POTS device, an analog phone, a digital phone, an IP telephony device, telephony software being executed by a computing device or any other suitable computing and/or communication device that communicates media using analog and/or digital signals. Device 12 may be implemented as hardware and/or software executing on one or more computers coupled to network 22. The device software or logic may be embodied in any type of medium including, but not limited to, hard drives, diskettes, CD-ROMs, DVD-ROMs, optical or magnetic media, field programmable arrays (FPGAs), embedded processors, or any other suitable media.

Handset 30 may include a speaker that allows a caller to hear incoming voice information from a remote device and a microphone that transmits voice information to a caller at the remote device. Keypad 34 may be used to generate in-band dual tone multifrequency (DTMF) signals or out-of-band signals for dialing a telephone number associated with a remote endpoint, responding to prompts for information, such as account numbers, entering a pin number or password to log into devices 12, or any other suitable function that may use in-band or out-of-band signals.

Display 32 may provide the user at device 12 with information associated with call sessions conducted over network 22. As illustrated in FIG. 2, the information may include filter 42 that provides a graphical representation of the frequency filter associated with a hearing impaired user. Display 32 may also provide the user with information associated with calls conducted over network 22, such as the identity and telephone umber of a user at a remote device, services and information accessible from database 18, or any other information that is stored in database 18 and/or associated with communication occurring over network 22.

In operation, a user may log into device 12 by providing a unique identifier that is associated with the user and may be used to verify the user's identity. The user may use keypad 34 or speak into the speaker contained in handset 30 to enter the appropriate numbers and/or letters associated with the identifier. Once the user is logged into device 12, the user may access a directory of telephone numbers associated with devices 12 coupled to network 22 by pressing button 36a, adjust the settings of the phone by pressing button 36b, listen to voice mail messages by pressing button 36c and/or access services available to the user over network 22 by pressing button 36d. The information provided when the user presses buttons 36 may be displayed for the user on display 32.

If the user is hearing-impaired and would like to generate and/or retrieve a frequency filter that corresponds to the user's frequency response, the user may press function button 36d to display the services available to the user on display 32. The user may select or scroll through the services with selection buttons 38a and 38b to choose filter 42. In another embodiment, filter 42 may be stored on device 12 and accessed by the user in response to pressing function button 36b. If the user previously created filter 42, the user selects filter 42 and it is applied to all incoming and outgoing calls from device 12.

The user may generate filter 42 through an interactive hearing test provided by device 12 and displayed on display 32. During the hearing test, the user may respond to tones presented through a speaker in handset 30 by using a computing device coupled to device 12, keypad 34 and/or selection buttons 38 on device 12, or any appropriate technique that allows the user to input frequency response information. For example, the user may use selection button 38a to enhance frequencies inside of the user's hearing range or the user may use selection button 38b to remove frequencies outside of the user's hearing range. In addition, the user may use keypad 34 to select a level of enhancement for a specific frequency or to move a specific amount of energy from an insensitive frequency range to a sensitive frequency range. By moving energy from the insensitive frequency range, the audio signals in a call session contain more frequencies that may be detected by the hearing-impaired user. The user may also use volume buttons 40 to increase or decrease the gain of a selected frequency. Additionally, keypad 34, selection buttons 38 and volume buttons 40 may be used in any combination during the hearing test to make an appropriate adjustment to filter 42 so that filter 42 matches the user's frequency response.

Once the user creates filter 42, filter 42 may be stored locally on device 12 and/or stored in database 18. The user may store filter 42 in a local memory or in database 18 by using keypad 34, function buttons 36 and/or selection buttons 38. In one embodiment, the user may store filter 42 in database 18 and log off of device 12. By logging off device 12, all of the user specific functions, including filter 42, are removed from device 12. When the user logs into device 14, device 14 may be configured to execute all services, including filter 42, associated with the user in database 18.

In one embodiment, device 14 includes processing resources that may process audio signals and apply filter 42. During configuration of device 14, filter 42 is stored in memory associated with device 14. Each time that the user places or receives a call at device 14, the processing resources retrieve filter 42 from the memory associated with device 14 and apply filter 42 to the audio signals either transmitted or received by device 14. If device 14 does not include processing resources, filter 42 may be loaded into a storage medium associated with either or both call manager 16 and call resource 20. Call resource 20 includes media processors that can apply filter 42 to any audio signals in a call session conducted by devices 12. Call resource 20 generates filtered audio signals that are communicated to device 14 and presented to the user. Even though device 14 may not include processing resources to apply filter 42, the user may have an improved listening experience during any call session conducted over network 22.

Figure 3:
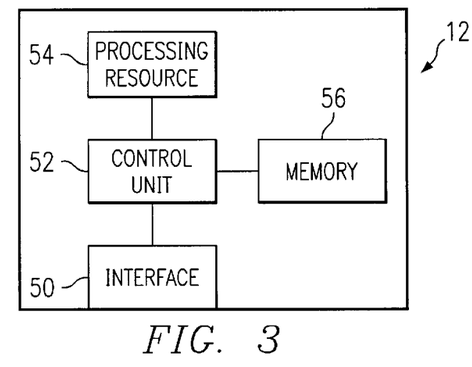
FIG. 3 illustrates a logical model of the device that is customized based on the frequency response for the hearing-impaired user.

FIG. 3 illustrates a logical model of devices 12 that may be customized based on a frequency response for a hearing-impaired user. In the illustrated embodiment, devices 12 include network interface 50, control unit 52, processing resource 54, memory 56 and speaker 58. Interface 50 may communicate with network 22, and may receive media streams from devices 12, call resource 20 and/or gateway 24, and signaling information from call manager 16. Interface 50 may be a physical port, virtual port, or other suitable direct or indirect connection. Control unit 52 may be one or a combination of a microprocessor, a microcontroller, a digital signal processor (DSP), or any other digital circuitry configured to control the operation of devices 12. Processing resource 54 may be one or more media processors, including but not limited to, microprocessors, DSPs or any other suitable digital circuitry that alters audio signals in a call session based on a frequency filter. Memory 56 may be any suitable form of a volatile or non-volatile memory that is integral or separate from devices 12.

In operation, control unit 52 configures and executes the services associated with a user at device 12. For example, when the user logs into device 12, control unit 52 receives an identifier associated with the user and communicates the identifier to call manager 16 via interface 50 to verify the identity of the user at device 12. In an alternative embodiment, call manager 16 may use ANI or dialed number identification service (DNIS) to identify devices 12 participating in the call session. For example, device 12 may initiate a call session with device 28 on PSTN 26. To identify the user at device 28, call manager 16 and/or gateway 24 uses DNIS to obtain the digits dialed by the user at device 12 and identify the user at device 28 by comparing the digits with telephone numbers stored in database 18. If the telephone number matches a number in database 18, call manager 16 and/or gateway 24 determines that device 28 is registered on network 22.

Once the user's identity has been verified, control unit 52 instructs call manager 16 to retrieve the services associated with the identifier from database 18. The services from database 18 may include, but are riot limited to, a frequency filter corresponding to a frequency response for the user and an initial volume level previously set by the hearing-impaired user. Control unit 52 receives the frequency filter via interface 50 and stores the frequency filter in memory 56.

When a hearing-impaired user places or receives a call from device 12, control unit 52 instructs processing resource 54 to apply the frequency filter stored in memory 56 to the incoming media stream. In one embodiment, the frequency filter is applied to audio signals received by device 12. In another embodiment, the frequency filter is applied to audio signals received and transmitted from device 12. In operation, control unit 52 receives audio signals from a remote device and retrieves the frequency filter from memory 56. Control unit 52 communicates the frequency filter to processing resource 54 and directs the incoming media stream to processing resource 54. Processing resource 54 receives both the audio signals and the frequency filter and applies the frequency filter to the audio signals. Control unit 52 then communicates the filtered audio signals to a speaker in handset 30 for presentation to the user.

If the user has not created the frequency filter, control unit 52 may display an option on display 32 that allows the user to generate the desired frequency filter by taking an interactive hearing test. During the hearing test, the user creates the frequency filter by responding to a series of tones produced by device 12. Control unit 52 generates an initial test tone played through a speaker in handset 30. The initial test tone has a first amplitude and frequency that may be heard by a person with average hearing. The user indicates if the user can hear the initial test tone by pressing a button, e.g., keypad 34, selection buttons 38 or volume buttons 40, on device 12, pressing a key on a keyboard associated with PC coupled to device 12, speaking into a microphone in handset 30 or any other suitable method that generates a signal that can be detected by control unit 52.

If the user can hear the initial test tone, control unit 52 generates another test tone at the same frequency but a lower amplitude. Control unit 52 continues to generate test tones at successively lower amplitudes until the user does not indicate that the user can hear the test tone or some minimum threshold has been reached. The final test tone for which control unit 52 receives a response from the user marks the hearing threshold of the user for the tested frequency.

If the user does not indicate that the user can hear the initial test tone, such as by taking no action, control unit 52 generates a test tone at the same frequency but at a higher amplitude. Control unit 52 continues to generate test tones at successively higher amplitudes until the user indicates that the user can hear the test tone or some maximum threshold has been reached. The final test tone for which control unit 52 receives a response from the user marks the hearing threshold of the user for the tested frequency.

Control unit 52 records the amplitude and frequency of the user's hearing threshold for the tested frequencies and stores the results in memory 56. Once control unit 52 collects enough information to create a frequency filter that corresponds to the user's frequency response. The frequency filter may be displayed on display 32 at device 12. The user may adjust the filter by increasing the gain of the frequencies that the user can hear at a normal level and/or transfer energy from a range of frequencies that the user cannot hear to a range of frequencies that the user can hear. Once the user has completed the hearing test, control unit 52 creates the frequency filter, stores the filter in memory 56 and stores the filter in database 18 so that the filter may be accessed from any of devices 12 coupled to network 22. When the user logs off of device 12, control unit 52 erases the frequency filter from memory 56.

Figure 4:
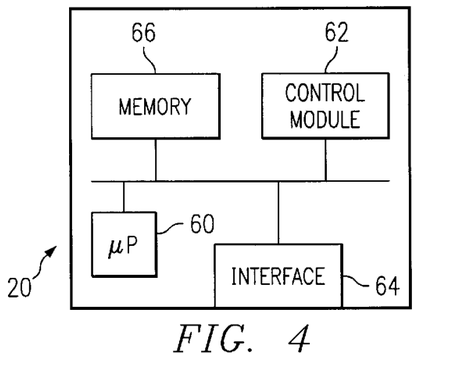
FIG. 4 illustrates a logical model of a call resource that applies a frequency filter corresponding to the frequency response for a hearing-impaired user to audio signals in a call session.

FIG. 4 illustrates a logical model of call resource 20 that applies a frequency filter associated with a hearing-impaired user to audio signals in a call session conducted at one of devices 12. Call resource 20 includes media processor 60, control module 62, network interface 64, and memory 66. Network interface 64 may communicate with network 22, and may receive media streams from devices 12 and/or gateway 24 and signaling information from call manager 16. Interface 64 may be a physical port, virtual port, or other suitable direct or indirect connection.

Media processor 60 may exchange and mix media communicated to and from devices 12 over network 22 and may apply a frequency filter associated with a hearing impaired user to audio signals in a call session. Media processor 60 operates with controllers, microprocessors, and/or digital signal processing (DSP) resources and may receive media streams from devices 12 and gateway 24, encode, decode, and/or transcode the media streams into a proper format, and generate a number of mixed media streams for communication to devices 12 and/or gateway 24. The media received by media processor 60 and the mixed media and filtered audio signals communicated by media processor 60 are in the form of media encoded in packets.

Control module 62 may provide overall control and management of a call session conducted using call resource 20. Specifically, control module 62 may provide administrative control, port assignment, admission control, command generation and receipt, and any other activities to control the call session and instruct media processor 60 to provide the appropriate signal processing for media packets received from devices 12 and gateway 24. Control module 62 may also receive signaling information for the call session from gateway 24 and/or call manager 16. Memory 66 may be any suitable form of a volatile or non-volatile memory that is integral or separate from call resource 20. Memory 66 stores program instructions for execution by control module 62, stores a frequency filter that may be applied by media processor 60 to audio signals in a call session, and also provides storage for buffering media packets received from and communicated to devices 12 and gateway 24.

In operation, call resource 20 receives a frequency filter via network interface 64 that is communicated from database 18 by call manager 16. Control module 62 stores the frequency filter in memory 66. When call resource 20 receives media packets associated with a call session being conducted at devices 12, control module 62 accesses memory 66 to obtain the frequency filter and provides the frequency filter to media processor 60. Media processor 60 decodes the media packets to obtain the audio signals and applies the frequency filter to the audio signals. Media processor 60 generates filtered audio signals and communicates the filtered audio signals to devices 12 via interface 64. Call resource 20 applies the frequency filter to the audio signals until the call session ends or call manager 16 instructs call resource 20 to stop applying the filter.

Figure 5:
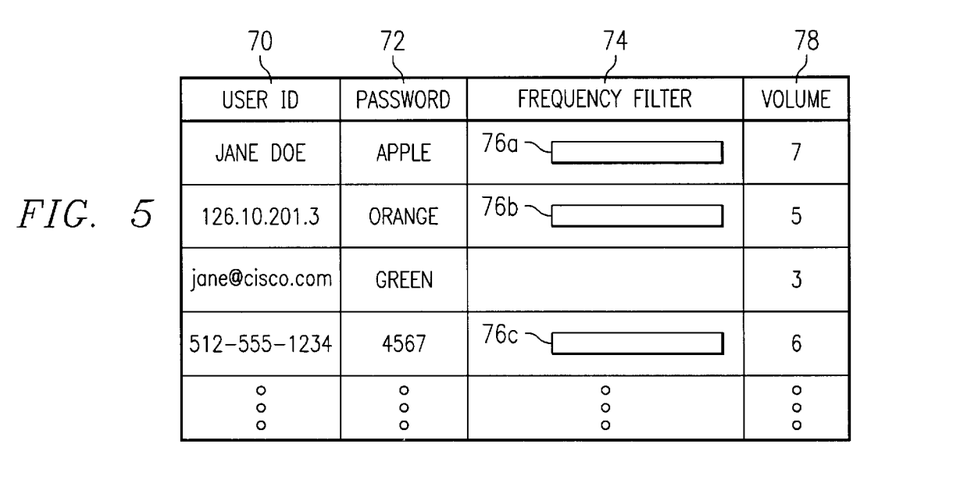
FIG. 5 illustrates a table for storing frequency filters associated with a plurality of hearing-impaired users.

FIG. 5 illustrates a table for storing frequency filters associated with a plurality of hearing-impaired users in database 18. The table includes information that is stored in user 70, password 72, filter 74 and volume 78. Although FIG. 5 illustrates a table containing specific information, it should be recognized that the table may contain any suitable information that may be stored in database 18.

User 70 includes the user names, addresses, such as an IP address, telephone numbers or any other suitable information that identifies a user that has access to network 22. Password 72 includes the unique identifiers used by the registered users to log into devices 12. The unique identifiers may be any combination of letters, numbers, or other suitable characters that may be spoken into a microphone located in handset 30, entered on keypad 34 of devices 12, entered on a keyboard associated with a personal computer (PC) coupled to devices 12, or any other suitable entry technique. Before being entered into database 18, the unique identifiers are encrypted to prevent unauthorized users from searching database 18 with a string of letters and/or numbers and obtaining the unique identifiers for the registered users.

Filter 74 contains frequency filters 76a, 76b and 76c that correspond to an individual user's frequency response. Frequency filters 76 may be created through an interactive hearing test that identifies specific frequencies and/or frequency ranges that the hearing impaired user has trouble hearing. The hearing test generates hearing compensation attributes based on the specific frequencies and creates a frequency filter containing the compensation attributes that matches the user's frequency response. The hearing compensation attributes may remove frequencies that are outside of the user's hearing range, enhance frequencies that are inside of the user's hearing range, move energy from an insensitive frequency range to a sensitive frequency range, or perform any suitable technique that enhances a particular user's listening experience during a call session. The hearing-impaired user may introduce frequency filters 76 into filter 74 located in database 18 through a PC coupled to device 12 and/or coupled to network 22, or the user may create the filter using display 32 on device 12.

During the hearing test or at any other appropriate time during configuration of the services on device 12, the user may also set a volume level for device 12. The volume level is stored in volume 78 and provides an initial volume level for the voice information being broadcast from the speaker in handset 30. At any point during a call session or while the user is logged into device 12, the user may manually adjust the volume level if the voice information presented at the speaker in handset 30 is either too loud or too soft.

In one embodiment, a user logs into device 12 by providing a unique identifier, such as a user name and a password. If call manager 16 verifies the user's identity, device 12 accesses database 18 by providing the identifier associated with the user to database 18. For example, device 12 may receive the password "apple" from the user "Jane Doe." Device 12 uses the user name and password to access database 18. If "Jane Doe" is a hearing-impaired user and has created frequency filter 76a, device 12 directly retrieves frequency filter 76a from database 18 and stores the frequency filter in memory 56 in device 12. When the user places or receives a call at device 12, frequency filter 76a will be applied to audio signals in the call session by processing resource 54 in device 12.

In an alternative embodiment, device 12 communicates a request to call manager 16 to obtain the frequency filter associated with the user from database 18. The request may include the identifier for the user and the address associated with device 12. Call manager 16 locates database 18 and uses the identifier to access database 18. Call manager 16 then obtains the frequency filter and uses the address provided in the request to communicate the frequency filter to device 12.

Figure 6:
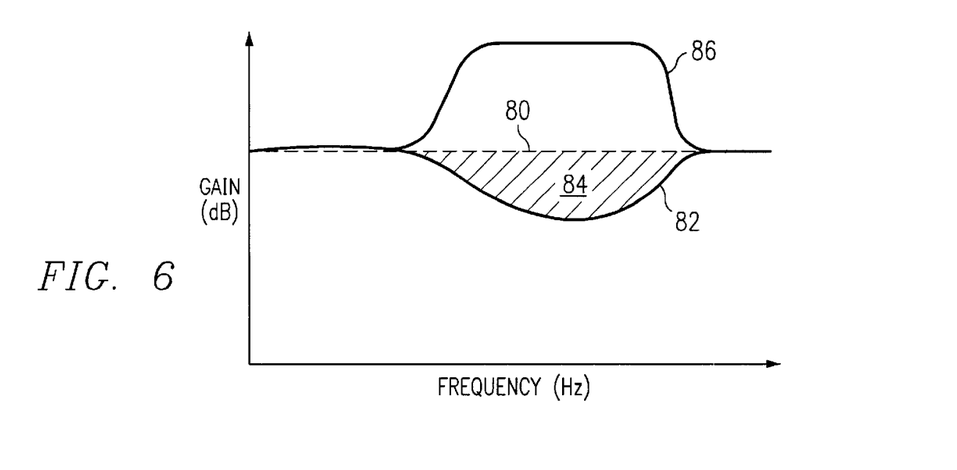
FIG. 6 illustrates a graph of the frequency filter corresponding to the frequency response for the hearing-impaired user.

FIG. 6 illustrates a graph of an example frequency filter that corresponds to a frequency response for a hearing-impaired user. Although FIG. 6 illustrates a specific frequency filter, it should be recognized that the graph may represent any frequency filters associated with users that have various degrees of hearing impairments. Normal response 80 represents the frequency response for a user without a hearing impediment. Normal response 80 indicates that the non-impaired user may hear a broad range of frequencies at a specific level. Impaired response 82 represents the frequency response for a hearing-impaired user. As illustrated, the user may not hear frequencies in notch 84 as well as frequencies above or below notch 84.

During the hearing test, the hearing-impaired user's responses to various tones may indicate that the user cannot hear frequencies in notch 84 as well as other frequencies in the tested range. In order to compensate for the impairment, frequency filter 86 may be generated. In operation, frequency filter 86 increases the gain of the frequencies in notch 84 that are contained in audio signals received by the user at device 12 during a call session. Frequency filter 86, therefore, modifies the frequencies in notch 84 so that the user may hear all frequencies at the same level and may have a frequency response closer to normal response 80.

In other embodiments, the hearing-impaired user may have a frequency response that prevents the hearing-impaired user from hearing frequencies within a specific range. The range of frequencies that cannot be heard by the user may form an insensitive frequency range and the frequencies that can be heard by the user may form a sensitive frequency range. The frequency filter created by the user to match the frequency response may remove the frequencies in the insensitive frequency range so that any frequencies in the audio signals associated with a call session contain only frequencies located in the sensitive frequency range. The frequency filter may also increase the gain of the frequencies in the sensitive frequency range so that the user may be able to better detect any audio signals that contain the sensitive frequencies. The gain of the audio signals including frequencies within the sensitive frequency range may also be enhanced by moving energy from the insensitive frequency range to the sensitive frequency range.

In one embodiment, the user may generate multiple frequency filters that correspond to the user's frequency response in different frequency ranges. The different frequency filters may be applied separately or in combination to audio signals in a call session placed or received by the hearing-impaired user on any of devices 12 coupled to network 22. In a further embodiment, non-linear processing is applied to the media stream received by device 12 in order to enhance the compensation provided to the hearing-impaired user.

Figure 7:
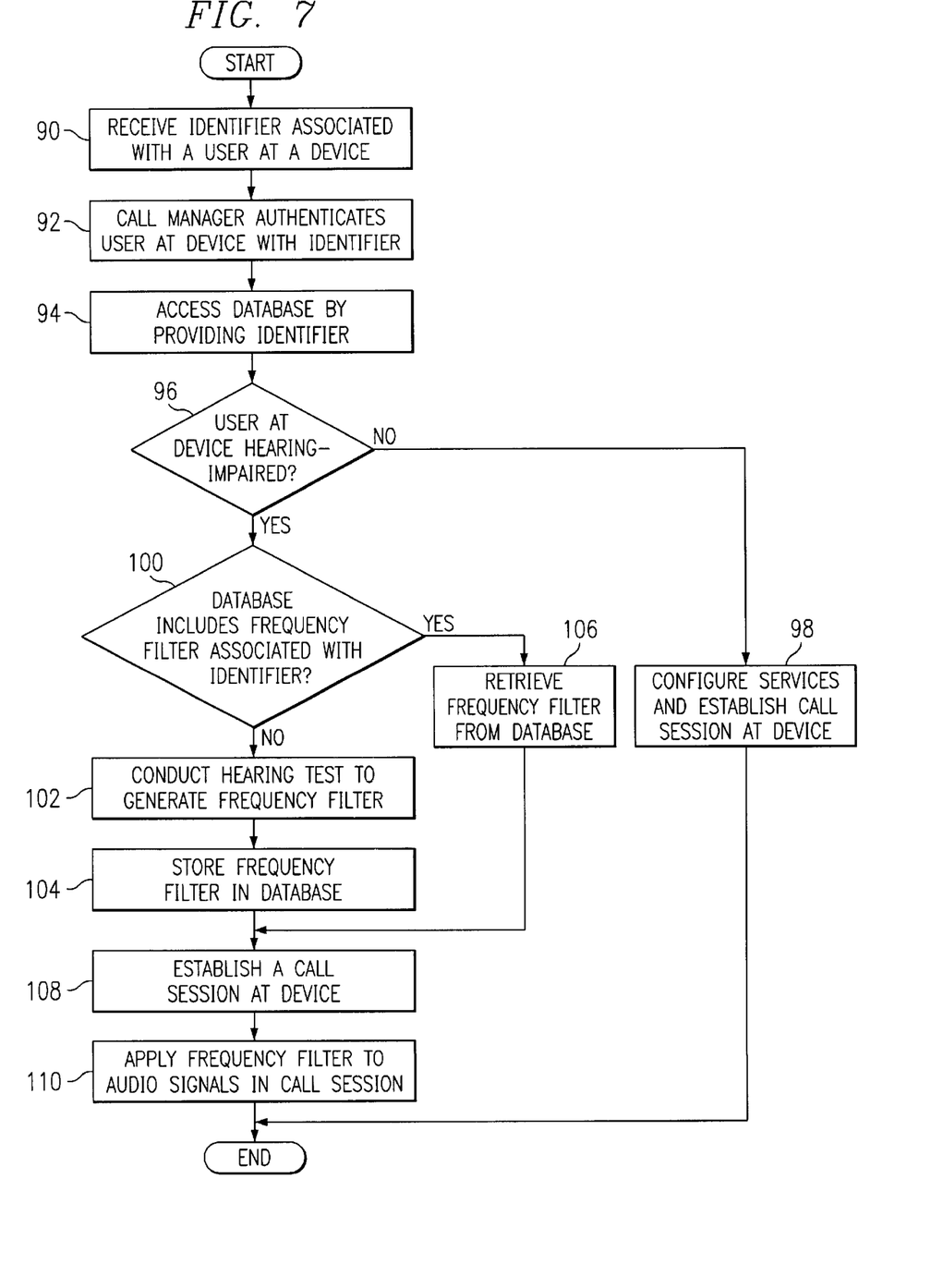
FIG. 7 illustrates a flow chart of a method for customizing a telephone based on a frequency response for a hearing-impaired user.

FIG. 7 illustrates a flow chart of a method for customizing a device based on a frequency response for a hearing-impaired user. Generally, a hearing-impaired user may generate a frequency filter that corresponds to the user's frequency response by taking an interactive hearing test on device 12. The frequency filter may be stored in database 18 so that any of devices 12 may access the frequency filter when the hearing-impaired user logs into devices 12. For example, the hearing-impaired user logs into device 12 to place or receive a telephone call by providing a unique identifier. During login, device 12 uses the identifier to access database 18 and retrieve the frequency filter associated with the hearing-impaired user. The frequency filter is configured on device 12 and applied to audio signals in a telephone call received or placed by the hearing-impaired user at device 12.

At step 90, device 12 receives an identifier in response to a user logging into device 12 in order to access network 22.

The identifier may include a user name, address, telephone number, and/or a password or pin number that uniquely identifies the user. In one embodiment, the identifier may be any combination of letters, numbers or other suitable characters that may be spoken into a microphone located in handset 30, entered on keypad 34 of device 12, entered on a keyboard associated with a PC coupled to devices 12, or provided by any other suitable entry technique. In another embodiment, the identifier may be a telephone number determined by device 12, call manager 16 or gateway 24 through ANI, DNIS or any other suitable technique that may use the digits of a telephone number to determine the identity of a user at device 28 and/or the address associated with device 28. At step 92, call manager 16 uses the identifier to authenticate the identity of the user that logged into device 12. If the user's identity is authenticated, call manager 16 or gateway 24 uses the identifier to access database 18 to determine if the user has created a frequency filter that corresponds to the user's frequency response at step 94.

At step 96, database 18 uses the identifier to determine if the user associated with the identifier is a hearing-impaired user. If the user is not hearing-impaired, the services associated with the user are communicated to device 12 and the user can establish a call session once the services are configured on device 12 at step 98. If the search by database 18 determines that the user is hearing-impaired, database 18 determines if the hearing-impaired user has created a frequency filter at step 100.

If database 18 does not include a frequency filter associated with the hearing-impaired user, device 12 conducts an interactive hearing test to generate a frequency filter corresponding to the user's frequency response at step 102. During the hearing test, control unit 52 collects responses from the user to various tones and creates a frequency filter that matches the user's frequency response. In operation, the frequency filter may remove frequencies in an insensitive frequency range, increase the gain of frequencies in sensitive frequency ranges, move energy from the insensitive frequency range to the sensitive frequency ranges and/or increase the gain of frequencies in notch 84 during a call session placed over network 22. In an alternative embodiment, the frequency filter may be generated external from device 12 and loaded into device 12 by a PC coupled to device 12 or network 22, or any other suitable computing platform that may communicate over network 22.

Once the hearing test is complete and control unit 52 stores the frequency filter in memory 56, device 12 stores the frequency filter in database 18 at step 104. In an alternative embodiment, device 12 may send a request to call manager 16 to store the frequency filter in database 18. Call manager 16 identifies the user at device 12, determines the address for database 18 and communicates the frequency filter from device 12 to database 18.

If database 18 includes a frequency filter associated with the hearing-impaired user, device 12 retrieves the frequency filter from database 18 and stores the filter in memory 56 at step 106. In an alternative embodiment, the user at device 12 may press one or a combination of keypad 34, function buttons 36, selection buttons 38, or a software button on display 32 to generate and send a request to call manager 16. The request instructs call manager 16 to retrieve the frequency filter from database 18 and deliver the filter to device 12. Device 12 then stores the filter in memory 56 for use by the user when a call session is established at device 12. In another embodiment, device 12 may not include processing resource 54. Call manager 16 uses the identifier to locate the frequency filter in database 18 and communicate the frequency filter to call resource 20. Call resource 20 receives the frequency filter and stores the filter in memory 66. During the call session, call manager 16 routes media streams in the call session through call resource 20 for processing by the frequency filter before directing the media streams to device 12.

In a further embodiment, device 28 may participate in the call session. The user at device 28 dials into gateway 24 by using a telephone number and provides an identifier to gateway 24. Gateway 24 uses ANI and the telephone number to located device 28 on PSTN 26 and uses the identifier to identify the user at device 28. Gateway 24 accesses database 18 to retrieve the frequency filter associated with the user by using the identifier, retrieves the frequency filter associated with the user at device 28, and stores the frequency filter in a storage medium associated with gateway 24 for use during the call session.

At step 108, the user at device 12 establishes a call session by placing or receiving a telephone call. Once the call session is established, the frequency filter is applied to audio signals received or transmitted by device 12 or gateway 24 at step 110. In one embodiment, device 12 includes processing resource 54 that can apply the frequency filter to the audio signals. Control unit 52 retrieves the frequency filter from memory 56 and communicates the frequency filter to processing resource 54. Processing resource 54 applies the frequency filter to the audio signals in the call session and generates filtered audio signals. Control unit 52 communicates the filtered audio signals from processing resource 54 to a speaker in handset 30 for presentation to the user. In an alternative embodiment, device 12 may instruct the remote device (e.g., device 14) participating in the call session to apply the frequency filter to the audio signals in an outgoing media stream. In this example, device 12 or call manager 16 communicates the frequency filter to the remote device so that the frequency filter may be applied to the audio signals generated by the user at the remote device before they are placed in packets and communicated in the call session over network 22.

In another embodiment, call resource 20 and/or gateway 24 may apply the frequency filter. For example, a user at device 12 may call a user at device 28 and devices 12 and 28 may not contain processing resources. Call manager 16 uses the identifier associated with the user at device 12 to retrieve the corresponding frequency filter from database 18. Call manager 16 then communicates the frequency filter to call resource 20 and re-routes the media streams in the call session to call resource 20. Call resource 20 then applies the frequency filter to audio signals in the media streams and call manager 16 routes the filtered audio signals to device 12. Gateway 24 may determine if the user at device 28 requires a frequency filter. Gateway 24 identifies the user at device 28 by obtaining the digits dialed by the user at device 12 and uses DNIS. Gateway 24 then uses the dialed digits and any identifier provided by the user to access database 18 to retrieve the frequency filter associated with the user at device 28. If gateway 24 includes processing resources, gateway 24 applies the frequency filter for the user at device 28 to the audio signals in the call session. Otherwise, call resource 20 applies the frequency filter and communicates the filtered audio signals for presentation to the user at device 28 through gateway 24.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for customizing a device based on a frequency response for a hearing-impaired user, comprising:
   receiving an identifier associated with a hearing-impaired user at any one of a plurality of devices operable to couple to a network;
   retrieving a frequency filter associated with the hearing-impaired user from a database by providing the identifier; and
   applying the retrieved frequency filter to audio signals in a call session conducted over the network for presentation to the hearing-impaired user at the one device, wherein applying the retrieved frequency filter to audio signals in the call session is performed by a processing resource located in the one device.

2. The method of claim 1, wherein the frequency filter is operable to remove the audio signals located in an insensitive frequency range.

3. The method of claim 1, wherein the frequency filter is operable to amplify the audio signals in a sensitive frequency range.

4. The method of claim 1, wherein the frequency filter is operable to transfer the audio signals from an insensitive frequency range to a sensitive frequency range.

5. The method of claim 1, wherein retrieving the frequency filter associated with the hearing-impaired user from the database is performed by a control unit located in the one device.

6. The method of claim 1, further comprising:
   receiving user input from the hearing-impaired user at a remote device to generate the frequency filter, the user input corresponding to a frequency response for the hearing-impaired user; and
   communicating the frequency filter from the remote device to the database, the database operable to store the frequency filter and the identifier associated with the hearing-impaired user.

7. The method of claim 1, wherein the one device is an Internet Protocol (IP) telephone.

8. The method of claim 1, wherein the identifier comprises a user name and a password.

9. The method of claim 1, wherein the database comprises an identifier and a frequency filter for each of a plurality of hearing-impaired users.

10. The method of claim 1, wherein the network comprises an IP network.

11. A method for customizing a telephone based on a frequency filter associated with a hearing-impaired user, comprising:
    receiving an identifier associated with a hearing-impaired user at any one of a plurality of telephones operable to couple to a network;
    retrieving a frequency filter associated with the hearing-impaired user from a database by providing the identifier; and
    applying the retrieved frequency filter to audio signals received by the hearing-impaired user at the one telephone, wherein applying the retrieved frequency filter is performed by a processing resource located in the one telephone.

12. The method of claim 11, wherein the frequency filter is operable to remove the audio signals located in an insensitive frequency range.

13. The method of claim 11, wherein the frequency filter is operable to amplify the audio signals in an insensitive frequency range.

14. The method of claim 11, wherein the frequency filter is operable to transfer the audio signals from an insensitive frequency range to a sensitive frequency range.

15. The method of claim 11, further comprising:
    receiving user input from the hearing-impaired user at a remote telephone to generate the frequency filter, the user input corresponding to a frequency response for the hearing-impaired user; and
    communicating the frequency filter from the remote telephone to the database, the database operable to store the frequency filter and the identifier associated with the hearing-impaired user.

16. The method of claim 11, wherein the identifier comprises a user name and a pin number.

17. The method of claim 11, wherein the telephone comprises a plain old telephone system (POTS) phone.

18. A method for customizing a telephone based on a frequency filter associated with a hearing-impaired user, comprising:
    receiving an identifier associated with a hearing-impaired user at any one of a plurality of telephones operable to couple to a network;
    retrieving a frequency filter associated with the hearing-impaired user from a database by providing the identifier; and
    applying the retrieved frequency filter to audio signals received by the hearing-impaired user at the one telephone, wherein applying the retrieved frequency filter is performed by a processing resource in a remote telephone communicating with the one telephone.

19. The method of claim 18, wherein the frequency filter is operable to remove the audio signals locates in an insensitive frequency range.

20. The method of claim 18, wherein the frequency filter is operable to amplify the audio signals in an insensitive frequency range.

21. The method of claim 18, wherein the frequency filter is operable to transfer the audio signals from an insensitive frequency range to a sensitive frequency range.

22. The method of claim 18, further comprising:
    receiving user input from the hearing-impaired user at a remote telephone to generate the frequency filter, the user input corresponding to a frequency response for the hearing-impaired user; and
    communicating the frequency filter from the remote telephone to the database, the database operable to store the frequency filter and the identifier associated with the hearing-impaired user.

23. The method of claim 18, wherein the identifier comprises a user name and a pin number.

24. The method of claim 18, wherein the telephone comprises a plain old telephone system (POTS) phone.

25. A communication apparatus, comprising:
    an interface operable to couple to a network;
    a control unit coupled to the interface, the control unit operable to:
      receive an identifier associated with a hearing-impaired user; and
      retrieve a frequency filter associated with the hearing-impaired user from a database by providing the identifier;
    a processing resource coupled to the control unit, the processing resource operable to apply the retrieved frequency filter to audio signals received at the interface;

a speaker coupled to the control unit, the speaker operable to present filtered audio signals generated by the processing resource to the hearing-impaired user; and a housing to couple the interface, the control unit, the processing resource, and the speaker into an integral unit.

26. The apparatus of claim 25, wherein the frequency filter is operable to remove the audio signals located in an insensitive frequency range.

27. The apparatus of claim 25, wherein the frequency filter is operable to amplify the audio signals in a sensitive frequency range.

28. The apparatus of claim 25, wherein the frequency filter is operable to transfer the audio signals from an insensitive frequency range to a sensitive frequency range.

29. The apparatus of claim 25, wherein the control unit is further operable to generate the frequency filter in response to receiving user input, the user input corresponding to a frequency response for the hearing-impaired user.

30. The apparatus of claim 25, wherein the identifier comprises a user name and a password.

31. The apparatus of claim 25, wherein the network comprises an Internet Protocol (IP) network.

32. Logic encoded in media for customizing a device based on a frequency response for a hearing-impaired user, the logic operable to perform the following steps:

receiving an identifier associated with a hearing-impaired user at any one of a plurality of devices operable to couple to a network;

retrieving a frequency filter associated with the hearing-impaired user from a database by providing the identifier; and applying the retrieved frequency filter to audio signals in a call session conducted over the network for presentation to the hearing-impaired user at the one device, wherein applying the retrieved frequency filter to audio signals in the call session is performed by a processing resource located in the one device.

33. The logic of claim 32, wherein the frequency filter is operable to remove the audio signals located in an insensitive frequency range.

34. The logic of claim 32, wherein the frequency filter is operable to amplify the audio signals in a sensitive frequency range.

35. The logic of claim 32, wherein the frequency filter is operable to transfer the audio signals from an insensitive frequency range to a sensitive frequency range.

36. The logic of claim 32, further comprising:

receiving user input from the hearing-impaired user at a remote device to generate the frequency filter, the user input corresponding to a frequency response for the hearing-impaired user; and communicating the frequency filter from the remote device to the database, the database operable to store the frequency filter and the identifier associated with the hearing-impaired user.

37. An apparatus for customizing a telephone based on a frequency response for a hearing-impaired user, comprising:

means for receiving an identifier associated with a hearing-impaired user at any one of a plurality of devices operable to couple to a network;

means for retrieving a frequency filter associated with the hearing-impaired user from a database by providing the identifier; and means for applying, at the one device, the retrieved frequency filter to audio signals in a call session conducted over the network for presentation to the hearing-impaired user at the one device.

* * * * *

UNITED STATES PATENT AND TRADEMARK OFFICE
CERTIFICATE OF CORRECTION

PATENT NO.    : 6,724,862 B1
DATED         : April 20, 2004
INVENTOR(S)   : Shaffer et al.

It is certified that error appears in the above-identified patent and that said Letters Patent is hereby corrected as shown below:

Title page,
Item [22], PCT Filed, delete "Jan 15, 2002", and insert -- Nov. 16, 2001. --.

Column 16,
Line 34, after "signals", delete "locates", and insert -- located --.

Signed and Sealed this

Twenty-fourth Day of August, 2004

JON W. DUDAS
*Director of the United States Patent and Trademark Office*